UNITED STATES PATENT OFFICE.

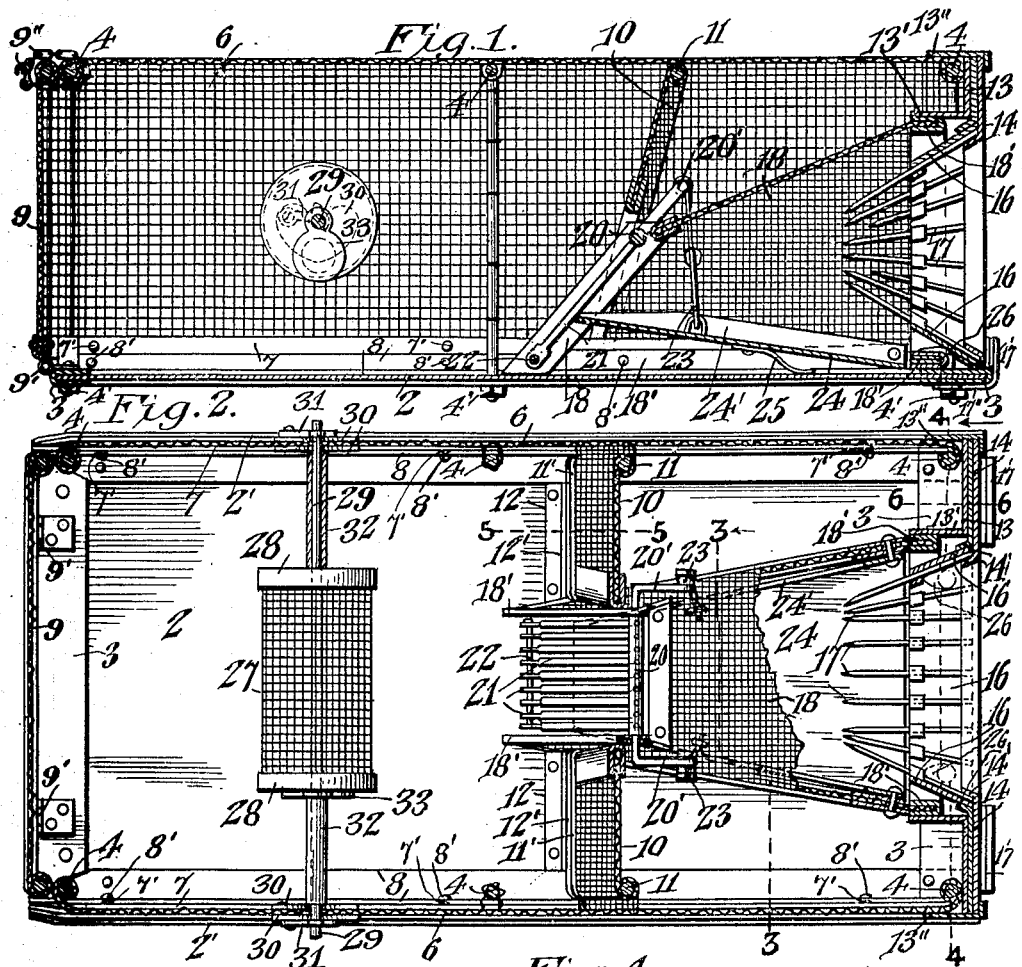

THOMAS H. HUGGINS, OF ZOLFO, FLORIDA.

ANIMAL-TRAP.

No. 926,419.  Specification of Letters Patent.  Patented June 29, 1909.

Application filed October 23, 1908. Serial No. 459,247.

*To all whom it may concern:*

Be it known that I, THOMAS H. HUGGINS, a citizen of the United States, residing at Zolfo, in the county of De Soto and State of Florida, have invented a new and useful Animal-Trap, of which the following is a specification.

My invention relates to animal traps, and particularly to traps of this character having body portions or cages, into which the animal passes, provided with means for preventing the return of the animal when once within.

The main object of the present invention is to provide a trap of this character which by changing the entrances used, may be converted into a fish trap, a bird trap, or a trap for small animals, such as rats, opossums, raccoons, etc.

Minor objects consist in providing means whereby the animal when once within the trap is prevented from opening the gate which has closed behind him, in providing means whereby the bait used while open to view, cannot be destroyed, in providing means whereby the bait shall be so supported as to excite the curiosity of the animals and attract them to the trap, and in details of construction and arrangements of parts which act to strengthen the structure and prevent the inclosed animal from escaping by tearing away any part of the trap.

To the ends referred to, my invention consists broadly in a trap having a plurality of gates or barriers, which may be used together or any one of which may be used separately.

The invention also consists in a trap having a rotatable bait carrier and in details of construction and arrangement of parts, set forth in the specification and more particularly stated in the claims appended.

In the drawings:—Figure 1 is a longitudinal vertical section of the trap made in accordance with my invention. Fig. 2 is a longitudinal section on a horizontal plane. Fig. 3 is a vertical fragmentary section on the lines 3—3 of Fig. 2. Fig. 4 is a vertical fragmentary section on the line 4—4 of Fig. 2. Fig. 5 is a fragmentary enlarged section on the lines 5—5 of Fig. 2. Fig. 6 is a fragmentary enlarged section on the lines 6—6 of Fig. 2.

Similar reference numerals designate corresponding parts in all the figures of the drawings.

My trap is formed of a base or bottom plate 2, which extends beneath the entire trap, and is made preferably of galvanized sheet iron. The lateral margins of the plate 2 are bent upwardly, as at 2', and the forward and rear margins are protected each by a folded binding strip 3, inclosing the edge of plate and riveted or otherwise attached to the plate 2. This construction is clearly shown in Fig. 6.

Attached to both ends and the middle of the trap body and extending upwardly from the bottom are the semicircular supports 4, whose reduced lower ends extend through the bottom or floor plate 2, and are screw threaded for the nuts 4', whereby the supports are securely clamped to the bottom.

Carried on the supports 4 is the wire cloth 6, which forms the sides and top of the trap. At its lower edges the wire cloth is bound between the folded metal strips 7, each attached to the net work by rivets 7'. The binding strips 7 are received between the upturned margins 2' of the bottom plate, and angle strips or irons 8. These strips extend along the lateral margins of the bottom plate, and are attached by rivets thereto. Rivets 8' pass through the angle plate 8, the binding strip 7 and the upturned margins 2'.

The construction thus described forms a trap body open at both ends having a bottom of sheet metal and an upper portion of wire netting preferably galvanized. At one end this body is closed by a door 9 of wire gauze or other suitable material, suitably braced and hinged at its bottom to the floor plate 2 by the hinges 9'. Any suitable fastening device may be used to hold this door closed. I have shown for this purpose the chain and hook 9'', but I do not wish to be limited thereto. The forward portion of the body is divided from the rear by a transverse partition 10 of wire gauze having an opening through it for the reception of the front end of a conducting passage to be hereafter described. While this partition may be constructed in any desired way, I preferably form it of a sheet of wire gauze supported by a semicircular frame 11 like the supporting frames 4, the lower edge of the wire mesh being bound by a folded strip 11'. The margins of the opening through this partition are also bound by folded strips, and the lower edge of the partition is attached to the bottom plate by clips 12, as shown in Fig. 5. These clips, each consists of a strip of metal, one edge of which forms a foot. The strip is then bent upwardly, folded downwardly, as at 12′, and again folded upward, as at 12″ to form a pocket for the reception of the lower edge of the partition. This construction not only holds the wire partition to the bottom plate, but prevents an animal from inserting its claws or teeth beneath the wire of the partition and forcing the wire cloth upward, thus getting a chance to tear away the lower edge of the partition, and pass into the other compartment of the trap.

The forward end of the cage body is closed by a removable end portion which carries inwardly projecting spikes preventing the return of an animal caught in the trap. In detail, this closure consists of an interior arch-shaped plate 13 inwardly flanged at 13′, and an outer arch-shaped plate 14 composed of two thicknesses of metal both inwardly flanged, at 14′, between which is held a ring plate 16 provided with a series of inwardly and centrally directed spikes 17, which by reason of their resiliency, permit the entrance of an animal into the cage but prevent its egress.

The upper curved margin of the plate 13 has soldered or otherwise secured thereto an inwardly extending flange or rim 13″, which extends over the body of the trap when the plate is in place. The lower margins of the plates 13 and 14 are received in and held by opposed U-shaped clips 17′, located one on either side of the bottom plate. These clips are each made of a U-shaped fold of metal having extensions 17″ and 17‴ from the lateral margins thereof, which extend one over and the other beneath the forward end of the bottom plate, and are riveted thereto, as shown in Fig. 6. The plates 13 and 14 are both removable so that the entrance end of the trap body may be entirely open if desired, as will be more fully described. Removably supported within the body of the trap is the tapering conducting chute 18, whose small end enters the opening in the partition 10, and whose larger end is received within the flange 13′, which surrounds the opening in the plate 13. The walls of this conducting chute are formed of wire net work, which at its bottom, rear and front edges are bound by a folded framing strip 18′.

The side walls of the small end of the conducting chute are downwardly and forwardly inclined, and the side framing strips 18″ thereof at their upper ends are pierced for the passage of a rocking bar 20, which forms the upper cross bar of a pivoted gate 21 composed of vertical bars held together at their lower ends by a cross bar 22. The rocking bar 20 passes through the side strips 18′ and its ends are bent to form cranks 20′ which are connected by links 23 to a tilting plate 24, the links passing through the wire mesh 18. This plate is pivoted at its rear end to the entrance end of the conducting passage and has the upwardly turned side edges 24′ which act to prevent an animal inserting its claws between the wire net work and the tilting bottom. These upwardly turned edges also prevent any dirt or other matter getting between the gate and the body of the passage, and preventing its easy operation. The under side of the gate is provided with a light spring 25 acting to hold the plate 24 in its uppermost position, and acting also to prevent any sudden dropping of the bottom, which would scare an animal entering the chute. It will be obvious that upon the entrance of an animal into the conducting passage, the plate 24 will be gently depressed and the gate 21 accordingly lifted to allow the animal to enter into the detention space on the other side of the partition 10, that is into the main body of the trap. By removing the front plates 13 and 14, this conducting chute may be removed or it is obvious that the chute might be used alone without the plates 13 and 14 and the inwardly projecting spikes. The larger end of the conducting chute is held in engagement with the body of the trap by the rotatable clips 26, whose heads engage over the bottom framing strip 18′ at the larger end of the conducting chute. By turning these clips and removing the plates 13 and 14, as before referred to, the conducting chute may be easily removed. It will be seen that a space is provided between the conducting chute and the outer walls of the trap body forwardly of the partition 10. Bait may be placed within this space in order to initially attract animals past the spikes 17.

In order to attract animals through the gate 21 and into the main body of the trap, I provide the rotatable bait-containing cylinder 27. This is formed of a cylinder of wire net work provided with two heads 28 at opposite ends. This cylinder is mounted upon a rotatable axis of any suitable construction so that the cylinder is easily rotated when any attempt is made to get at the bait within. The detailed construction, which I prefer, comprises a central shaft 29 forming the axis on which the cylinder turns, which shaft passes entirely through the cylinder and through the side walls of the cage, where it is supported in bearing plates 30 of any desired construction. In order to hold the shaft 29 upon the plates 30, I provide the hooks 31, pivoted to the plates 30, which are adapted to be forced down over the shaft 29. Tubular spacing sleeves 32 surround the shaft 29 at either end of the cylinder 27, thus holding the cylinder in a central position. It is obvious from this construction that the shaft 29 is fixed and the cylinder 27 rotates thereround. At one end the cylinder is provided with an opening through one of the heads 28, which is closed by a pivoted cover 33. Through this opening the cylinder may be filled with bait.

The advantages of my invention are as follows: The trap may be used for either fish, birds or animals as desired. When the trap is used for fish, the conducting chute is removed, and only the plates 13 and 14 used. In this case, the prongs 17 prevent the fish from returning once they are inside. When birds are to be trapped, the plates 13 and 14 are removed, leaving the entrance to the conducting chute free. The bird passes inward and its weight on the plate 24 lifts the gate 21, allowing the bird to pass into the body of the trap. As soon as the weight is taken off the bottom 24, the weight of the gate and the effect of the spring beneath the plate will close the gate. When animals are to be trapped, the plates 13 and 14 and the conducting chute both are to be used. This operation being obvious, it will be seen from Fig. 1 that the cranks whereby the gate 21 is actuated, are located forward of the partition 10 and that thus the animal within the trap cannot actuate the gate by pulling down upon the cranks or resting upon them accidentally. It will be seen, however, that the cranks and the actuating mechanism of the gate are yet entirely within the cage so that birds, and animals outside of the trap cannot accidentally actuate the gate and release the others confined within the trap. Another advantage of my device lies in the cylindrical revolving bait cage 27, which not only prevents an animal from getting at the bait, but which by its revolution, acts to decoy other animals into the trap through curiosity. It will be seen that in the construction of my cage, I have provided means for preventing absolutely any prying up of the margins of the wire body by confining the margins of the net work within folded strips, which are in turn riveted to the cage body. There is thus no opportunity for the animal to bend the wire body of the cage and escape. The wire net work of which the bait receptacle is formed permits the bait to be seen and to be smelled and acts also to attract animals by reason of their curiosity.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a trap, the combination with a detaining cage, of a removable end portion provided with an opening and having inwardly and centrally projecting spikes surrounding the opening, and a removable chute independent of the end portion and spikes and extending from the opening of the said end portion into the detaining cage, a pivoted gate disposed at the end of the chute opposite from the spikes, and a pivoted bottom located between the spikes and gate and adapted to lift said gate when depressed by the weight of an animal.

2. In a trap, the combination with a detaining cage, of a removable end portion provided with inwardly and centrally projecting spikes and a removable chute independent of the end portion, one end of which projects into the detaining cage and the other end of which surrounds the inwardly projecting spikes of said end portion, the chute having at its inner end a pivoted gate normally closed, said chute being provided with a pivoted bottom adapted to lift the gate when depressed by the weight of an animal.

3. In a trap, a cage open at one end and provided with an intermediate partition having an opening therethrough, a chute of wire netting, one end of which projects into the opening in said partition, but removable therefrom, said chute open at its outer end and at its inner end being provided with a pivoted gate, the bottom of the chute being hinged and connected to said pivoted gate to actuate the same when depressed by the weight of an animal, said gate normally resting in closed position on the free end of the chute bottom, and an end portion adapted to close the open end of said cage having an opening therethrough, said opening being surrounded by inwardly and centrally projecting spikes.

4. A trap having a body portion open at one end, closed at the other by a hinged door and composed of wire netting, a transverse partition dividing said body portion and provided with an opening therethrough, a removable chute having one end thereof adapted to project through the opening in the partition, a gate pivoted to the inner end of the chute and adapted to open into the space behind said partition, crank arms adapted to move said gate, a bottom plate pivoted to said chute, links connecting the bottom plate to the crank arms so arranged that when the bottom is depressed the crank arms shall be moved to lift the gate, said bottom plate constituting means for supporting the gate when in closed position, and an end portion adapted to close the end of the trap body and having an opening adapted to register with the open end of the chute.

5. In a trap, the combination of a body having an end wall provided with an entrance opening, a partition in the body provided with an opening, and a trapping device removably mounted in the body and disposed between the said openings, said device comprising a chute, a movable door mounted on and removable with the chute, and a yielding bottom secured to and removable with the chute and operatively connected with the gate for actuating the same.

6. In a trap, a bottom plate of sheet metal having upturned side margins, angle strips riveted inside of but adjacent to said upturned edges, supporting frames projecting upward and over the bottom plate, wire netting stretched over said frames, and folded binding strips attached to the margins of the wire netting, said binding strips being received between said angle strips and the upturned lateral margins of the bottom plate and riveted thereto.

7. In a trap, a bottom plate of sheet metal having upturned side margins, supporting frames projecting upward and over said bottom plate, wire netting stretched over said frames and attached at its margins to the upturned margins of the bottom plate, a partition of wire netting dividing the body portion of the trap, said partition having an opening therethrough, a removable end plate closing the front end of the trap and provided with an opening and having inwardly and centrally projecting spikes, and a removable conducting chute of wire net work having its extremities detachably received in the openings of the end plate and partition.

8. In a trap, a bottom plate of sheet metal, supporting frames projecting upward and over the bottom plate, wire netting stretched over said frames and attached to the bottom plate, a hinged door closing one end of the trap, a transverse partition of wire netting dividing the trap into two portions, a removable plate closing the other end of the trap and provided with an opening and having inwardly and centrally projecting spikes, a removable chute of wire netting smaller than the body of the trap leading from said opening in the end plate to and through said partition, and fastenings for detachably securing the chute in position.

9. In a trap, a bottom plate of sheet metal having upturned side edges, angle strips secured to the bottom plate adjacent to said upturned edges, supporting frames attached to the bottom plate and projecting upward and over the same, wire netting stretched over said frames to form the body of the trap, folded binding strips attached to the lateral margins of the wire netting and received between said angle strips and the upturned lateral margins of the bottom plate and riveted thereto, a hinged door closing one end of the body portion of the trap, a transverse partition of wire netting having an opening therethrough, metal clips projecting upward from the bottom of the trap into which the lower edge of the partition is received, metal clips projecting upward from the bottom plate of the trap at one end thereof, a removable end plate whose lower edge is adapted to be received within said clips, said end plate having an entrance opening, inwardly and centrally projecting spikes surrounding said entrance opening, and a conducting chute of wire netting adapted at one end to surround the inwardly projecting spikes and at its other end to project through the opening of said partition.

10. In a trap, a bottom plate of sheet metal, supporting frames attached to the bottom plate and projecting upward and over the same, wire netting stretched over said frames and attached to the bottom plate, a hinged door of wire netting closing one end of the trap, a partition of wire netting dividing the trap into two portions and having an opening, a removable end plate having an entrance opening surrounded by inwardly and centrally projecting spikes, and a tapering conducting chute of wire netting independent of the end plate and having its smaller end disposed at the opening of the said partition, the forward end of the chute having a binding strip inclosing the margins of the wire netting and extending across the bottom of the chute.

11. In an animal trap, a detaining compartment, an entrance compartment having an opening, and a conducting chute leading through the entrance compartment, and into the detaining compartment, the walls of said trap and the chute being of wire netting, there being a forward bait containing chamber formed between the walls of the chute and the outer walls of the trap, said chute being entirely removable from the entrance compartment, means for preventing egress from the trap through the chute or through the said opening when the chute is removed, and means for supporting bait within the detaining compartment.

12. In an animal trap, a detachable trapping device comprising a chute open at one end, a movable gate closing the other end and supported on the chute, a yielding bottom secured to the chute and arranged to form a stop against which the gate bears when in closed position, connecting means between the gate and bottom for operating the former by the movement of the latter, and means on the bottom for yieldingly holding the same in normal position.

13. In an animal trap, the combination of a body of net-work, a shaft extending across the body, bearings on the walls of the body for receiving the ends of the shaft, a bait-holding basket supported wholly on the shaft and having a filling opening, and spacing devices on the shaft for holding the basket in position and coöperating with the bearings and basket to brace the walls of the body.

14. An animal trap having walls of wire net work, a wire net work partition dividing the trap into an entrance portion and a detaining portion, a conducting chute of wire net work leading from the forward end of said trap through said partition and having an automatically closing gate at the inner end thereof, a wall closing the forward end of the trap and provided with an entrance opening leading into said conducting chute, and a plurality of spikes on the wall arranged to converge inwardly and located within the chute, said wall having an inwardly-extending flange to which the outer end of the chute is secured.

15. In a trap, the combination of a body, a partition dividing the same into entrance and retention compartments, the outer wall of the entrance compartment being provided with an opening and having a marginal flange around the opening, a ring disposed around the flange and arranged within the compartment, a plurality of spikes arranged within the ring in converging relation with their outer ends confined between the ring and said flange, and means on the ring for receiving the intermediate portions of the spikes to rigidly hold the latter in place.

16. In a trap, a bottom plate of sheet metal having upturned side edges, angle strips riveted inside of but adjacent to said upturned edges, supporting frames projecting upward and over the said bottom plate, wire netting stretched upon said frames, folded binding strips attached to the margins of the wire netting, said binding strips being received between said angle strip, and the upturned lateral margins of the bottom plate and riveted thereto, a door of wire netting closing one end of said trap, a partition of wire netting dividing the trap into two portions and having an opening, binding strips along the margin of the partition netting, upwardly projecting U-shaped clips attached to the bottom plate and adapted to receive the lower edges of the partition, upwardly projecting U-shaped clips attached to the forward edge of the bottom plate, an end plate having an inwardly projecting marginal flange adapted to close the forward end of the trap, the lower edges of said end plate being received within said clips, an entrance opening through said end plate, spikes attached to the end plate surrounding said opening and inwardly and centrally projecting, and a tapering conducting chute of wire nettting, the larger end of which surrounds said inwardly projecting spikes, and the smaller end of which projects through the said partition.

17. In a trap, a bottom plate of sheet metal having upturned side edges, supporting frames projecting upward and over the bottom plate, wire netting stretched over said frames and attached to the bottom plate, a door closing one end of the trap, a removable end portion closing the other end of the trap, said end portion being composed of an outer and an inner plate, the outer plate having an entrance opening provided with inwardly and centrally projecting syikes surrounding the same and the margin of the plate having an inwardly turned flange adapted to engage over the end of the trap, the inner plate being arch-shaped and having an inwardly extending flange surrounding said spikes.

18. In a trap, a bottom plate of sheet metal having upturned side edges, supporting frames projecting upward and over the bottom plate, wire netting stretched over said frames and attached to the bottom plate, a door closing one end of the trap, a partition of wire netting dividing said trap into two portions and having an opening therein, a removable end portion closing the other end of the trap, said end portion being composed of an outer and an inner plate, the outer plate having an entrance opening provided with inwardly and centrally projecting spikes surrounding the same, and the margins of the plate having an inwardly turned flange adapted to engage over the end of the trap, the inner plate being arch-shaped and having an inwardly extending flange surrounding said spikes, and a tapering conducting chute of wire netting, the larger end thereof adapted to extend inside of the inwardly projecting flange of the inner plate and surround the said inwardly projecting spikes, the smaller end of the chute having its inner end extending through the said partition.

In testimony, that I claim the foregoing as my own, I have hereto affixed my signature in the presence of two witnesses.

THOMAS H. HUGGINS.

Witnesses:
T. P. LEWIS,
W. R. DeLAACH.